United States Patent
Ha et al.

(10) Patent No.: US 10,239,165 B2
(45) Date of Patent: Mar. 26, 2019

(54) EYEBROW COIL JACKET, A HEAT CONTROL APPARATUS OF A REACTOR USING THE EYEBROW COIL JACKET, AND A METHOD FOR MANUFACTURING THE HEAT CONTROL APPARATUS

(71) Applicant: LG CHEM, LTD., Seoul (KR)

(72) Inventors: Hyun Kyou Ha, Daejeon (KR); Suk Soo Lim, Daejeon (KR); Tae Jung Kim, Daejeon (KR); Jin Kee Lim, Daejeon (KR); Kyung Hyun Kim, Daejeon (KR); Kyung Won Ryu, Daejeon (KR); Joong Chul Lom, Daejeon (KR)

(73) Assignee: LG CHEM, LTD., Seoul (KR)

( * ) Notice: Subject to any disclaimer, the term of this patent is extended or adjusted under 35 U.S.C. 154(b) by 210 days.

(21) Appl. No.: 14/241,754

(22) PCT Filed: Nov. 13, 2013

(86) PCT No.: PCT/KR2013/010255
§ 371 (c)(1),
(2) Date: Feb. 27, 2014

(87) PCT Pub. No.: WO2014/077567
PCT Pub. Date: May 22, 2014

(65) Prior Publication Data
US 2015/0053386 A1   Feb. 26, 2015

(30) Foreign Application Priority Data

Nov. 16, 2012  (KR) .................. 10-2012-0130013
Nov. 8, 2013   (KR) .................. 10-2013-0135093

(51) Int. Cl.
*B23P 15/26*   (2006.01)
*B01J 19/24*   (2006.01)
(Continued)

(52) U.S. Cl.
CPC ............. *B23P 15/26* (2013.01); *B01J 19/18* (2013.01); *B01J 19/24* (2013.01); *C08F 2/01* (2013.01);
(Continued)

(58) Field of Classification Search
CPC ............... F28D 1/06; Y10T 29/49968; Y10T 29/49362; C08F 2/01; B23P 15/26; B01J 2219/0009; B01J 2219/00094
See application file for complete search history.

(56) References Cited

U.S. PATENT DOCUMENTS 4,205,720 A * 6/1980 Epstein ............... F28D 1/06
                                               165/169
4,750,556 A * 6/1988 del Valle P. .......... B01J 8/087
                                               165/109.1
(Continued)

FOREIGN PATENT DOCUMENTS

DE    29907830 U1    9/2000
GB    2095815 A      10/1982
(Continued)

OTHER PUBLICATIONS

Carpenter, K.J. Agitated Vessel Heat Transfer (thermopedia.com/content/547/) Feb. 2, 2011.*
(Continued)

*Primary Examiner* — Jon T. Schermerhorn, Jr.
(74) *Attorney, Agent, or Firm* — Dentons US LLP

(57) ABSTRACT

Disclosed herein is an eyebrow coil jacket, a heat control apparatus of a reactor using the eyebrow coil jacket, and a method for manufacturing the heat control apparatus of the reactor. According to the present invention, it is possible to provide an eyebrow coil jacket that is capable of increasing the heat control area of the reactor even when applied to a large-sized reactor so that a heat control amount of the heat
(Continued)

control apparatus is improved 20% more than when a half pipe coil is used, a heat control apparatus of a reactor using the eyebrow coil jacket, and a method for manufacturing the heat control apparatus of the reactor.

6 Claims, 2 Drawing Sheets

(51) Int. Cl.
 *F28D 1/06* (2006.01)
 *C08F 2/01* (2006.01)
 *B01J 19/18* (2006.01)

(52) U.S. Cl.
 CPC ......... *F28D 1/06* (2013.01); *B01J 2219/0009* (2013.01); *B01J 2219/00094* (2013.01); *B01J 2219/00108* (2013.01); *Y10T 29/49362* (2015.01); *Y10T 29/49968* (2015.01)

(56) References Cited

U.S. PATENT DOCUMENTS 5,342,920 A * 8/1994 Imai ............... B01J 19/0013
 422/138
2002/0040777 A1 4/2002 Tomlinson et al.

FOREIGN PATENT DOCUMENTS

| JP | 05-222102 | 8/1993 |
| JP | 06-101984 | 4/1994 |
| KR | 1020060034682 | 4/2006 |
| KR | 1020110101663 | 9/2011 |

OTHER PUBLICATIONS

Handbook for Designing an Agitation and Mixing Apparatus, Chen, Zhiping et al., China Chemical Industry Press, p. 171, in Apr. 2004.
"Agitated Vessel Heat Transfer"; Carpenter; http://www/thermopedia.com/content/547/?tid=110&sn=5. Feb. 25, 2011.

* cited by examiner (a)

(b)

EYEBROW COIL JACKET, A HEAT CONTROL APPARATUS OF A REACTOR USING THE EYEBROW COIL JACKET, AND A METHOD FOR MANUFACTURING THE HEAT CONTROL APPARATUS

This application is a National Stage Entry of International Application No. PCT/KR2013/010255, filed Nov. 13, 2013 and claims the benefit of Korean Application No. 10-2012-0130013, filed on Nov. 16, 2012, and Korean Application No. 10-2013-0135093, filed Nov. 8, 2013 all of which are hereby incorporated by reference in their entirety for all purposes as if fully set forth herein.

TECHNICAL FIELD

The present invention relates to an eyebrow coil jacket, a heat control apparatus of a reactor using the eyebrow coil jacket, and a method for manufacturing the heat control apparatus, and more particularly, to the eyebrow coil jacket that can be provided any improved heat control area even when is applied in larger reactor, a heat control apparatus of the reactor using the eyebrow coil jacket, and a method for manufacturing the heat control apparatus.

BACKGROUND ART

The exothermic polymerization, upon the polymerization reaction of various substances in the characteristic of the polymerization, raises the temperature inside the reactor, and thus uses such as a jacket and a reflux condenser in order to maintain a constant temperature.

Kinds of the jacket used in continuous or batch polymerization reactors are the oldest Single External type, Half Pipe Coil type surrounding as the coil form around the reactor, and Constant Flux Cooling type developed in recent years and so on.

The single external type jacket is manufactured to have a structure in which another space is formed in a wall of the reactor such that chilled water can flow in the space. When the single external type jacket is applied to a small-sized reactor, the single external type jacket cools the reactor through the entirety of the wall of the reactor. Consequently, the single external type jacket can be effectively used for the small-sized reactor. On the other hand, as the size of the reactor is increased, circulation of the coolant flowing in the jacket is difficult so that uniform cooling may be difficult depending upon the position of the reactor.

The half (½) pipe coil type jacket is a spiral type jacket configured such that a half pipe is wound on the outer wall of the body of the reactor in a coil shape. This type jacket has an advantage in that a coolant is rapidly circulated and thus it is possible to uniformly adjust temperature irrespective of the position of the reactor. For this reason, the half pipe coil type jacket is also usually used for a large-sized reactor.

At a welding process to fix the pipe to the outer wall of the reactor, however, an interval is provided between pipes so that it is difficult to cool the reactor through the entirety of the wall of the reactor unlike the single external type jacket.

The constant flux cooling type jacket is similar to the single external type jacket but has an advantage in that another jacket for controlling temperature is provided in the jacket to rapidly and precisely adjust temperature. However, initial manufacturing cost of this type jacket is high, and thus the constant flux cooling type jacket cannot be easily applied.

Meanwhile, in order to solve a problem in that a heat control area of the reactor is reduced due to the increase in size of the reactor for improving productivity, a method of supplying a coolant to a jacket and a baffle to directly remove heat generated from a reactant has been proposed. In this method, however, operation cost is excessively increased.

In addition, a reflux condenser may be used as a method of easily solving a heat control area problem. In this case, however, quality may be deteriorated. That is, as the size of the reactor is greatly increased, a cooling rate of the reflux condenser is increased. As the cooling rate of the reflux condenser is increased, a polymerized material during reaction or foam generated in the reactor may flow to the reflux condenser so that scale may be formed in the reflux condenser. In a case in which scale is formed in the reflux condenser, it is difficult to remove the scale from the reflux condenser and cooling efficiency is lowered so that productivity is lowered. In addition, the scale may fall into the reactor so that quality of a product in the reactor is badly affected.

In order to solve the above problem, a jacket mounted at the inner wall of the reactor has been proposed. In this case, direct cooling is possible without cooling through the body of the reactor so that cooling is more efficiently achieved than the jacket mounted at the outer wall of the reactor. In a case in which a material to improve heat transfer efficiency is used, however, cost of a product is increased since such a material is very expensive. In a case in which scale is formed in the jacket, it is difficult to remove the scale from the jacket and quality of a product in the reactor is badly affected. In order to prevent this problem, a special scale preventer may be used, but cost of a product is increased.

For example, Japanese Patent Registration No. 2836756 discloses a method of effectively performing cooling through circulation of a reactant using a cooler installed at the outside unlike conventional polymerization. In this method, however, the cooler for cooling and a pump for circulation must be additionally installed so that electric charges and initial investment expenses are increased and thus cost of a product is increased.

Therefore, there is a necessity for technology that is capable of increasing a heat control area of a jacket of a heat control apparatus of a polymerization reactor, thereby improving productivity, and increasing a cooling percentage ratio of a baffle and the jacket to a reflux condenser, thereby stably manufacturing various materials while maintaining quality of the materials.

DISCLOSURE

Technical Problem

It is an object of the present invention to provide an eyebrow coil jacket that is capable of maximally using an area of the body of a reactor to increase a heat control area of the reactor in a half pipe coil jacket fixed to the outer wall of the body of the reactor, thereby improving productivity and quality of products, a heat control apparatus of a reactor using the eyebrow coil jacket, and a method for manufacturing the heat control apparatus of the reactor.

Technical Solution

According to the present invention, the above object can be accomplished by the provision of an eyebrow coil jacket manufactured with an eyebrow coil type pipe 5.

In addition, according to the present invention, there is provided a heat control apparatus of a reactor comprising the eyebrow coil jacket.

Furthermore, according to the present invention, there is provided a method for manufacturing the heat control apparatus of the reactor, comprising steps of: preparing a plurality of eyebrow coil type pipes, disposing the pipes on an outer wall of the body of the reactor, and welding the pipes along the outer wall of the reactor as a spiral tunnel shape.

Hereinafter, the present invention will be described in more detail.

First, the present invention has a technical feature to provide a heat control apparatus of a reactor using an eyebrow coil jacket 5 as a half pipe coil jacket usually provided for a continuous or batch reactor such that the entirety of the wall of the reactor can be used and a method for manufacturing the same.

The term "eyebrow coil jacket" in the present invention refers to a jacket manufactured by preparing carbon steel or stainless metal material exhibiting high thermal conductivity as an eyebrow shape and then affixing the eyebrow-shaped carbon steel or stainless metal material to the outer wall of the body of a reactor by welding unless mentioned otherwise. For one example, the eyebrow-shaped may be cut pipe a circular or oval pipe into an eyebrow shape and then be used.

The eyebrow coil jacket used in the present invention has a spiral shape wound a half pipe around the outer wall of the body of the reactor as a coil shape. This type jacket has an advantage in that a coolant is rapidly circulated and thus it is possible to uniformly adjust temperature irrespective of the position of the reactor. For this reason, the eyebrow coil jacket is also usually used for a large-sized reactor.

Specifically, the eyebrow coil jacket according to the present invention is characterized in being manufactured with an eyebrow coil type pipe 5.

As previously described, the eyebrow coil type pipe 5 is obtained by cutting a circular pipe made of carbon steel or stainless metal material exhibiting high thermal conductivity as an eyebrow shape, bending the cut pipe using a machine as needed to form a sealed tunnel around the outer wall of the reactor upon welding, and affixing to the outer wall of the body of the reactor by welding. For one example, the circular pipe may be cut such that the circular pipe has a length equivalent to 25 to 40%, 27 to 37%, or 30 to 35% based on the inner diameter of the circular pipe or may have such a shape. In this case, a heat control area of the reactor may be maximized when the circular pipe cut as described above is affixed to the reactor.

Alternatively, the eyebrow coil type pipe may be obtained by cutting an oval pipe made of carbon steel or stainless metal material exhibiting high thermal conductivity such that the eyebrow coil type pipe has the above size or may have such a shape. In this case, a heat control area of the reactor may be maximized when the eyebrow coil type pipe is affixed to the reactor.

The eyebrow coil jacket, the eyebrow coil type pipe 5 is fixed to the outer wall of the reactor in a spiral shape by welding to form a tunnel along the outer wall of the reactor. For example, the eyebrow coil jacket may circulate a coolant flowing in the eyebrow coil type pipe 5 to perform heat exchange (see FIG. 1).

At this time, water or chilled water may be used as the coolant.

In another example, the spiral tunnel is characterized in that an angle between a normal line of the reactor and a tangent line of the eyebrow coil jacket is equal to or greater than 35° and less than 60°, 35° to 55°, or 35° to 50°.

In the present invention, a gap interval between pipe layers constituting the spiral tunnel is less than a distance a between jacket welded portions 8 formed on the reactor by welding of the pipe, which is achieved only through application of the eyebrow coil jacket.

Specifically, in a case in which under 50° to 60°, 50° to 55°, or about 55° or less as a welding tangent angle for full penetration (well penetration), the height of the eyebrow coil jacket is less than that of the half pipe coil jacket (see symbols d and e of FIG. 3) so that the distance a between jacket welded portions 8 is narrowed. Consequently, only one welding point is possible, thereby increasing a heat control area of the reactor.

According to the present invention, there is provided a heat control apparatus of a reactor comprising the eyebrow coil jacket.

The above reactor may be, but is not limited to, a continuous or batch polymerization reactor.

Also, the reactor may have a reflux condenser, a baffle, etc. as needed.

The heat control apparatus of the reactor may be manufactured using various methods, for example, is as follows: comprising steps of preparing a plurality of eyebrow coil type pipes, disposing the pipes on an outer wall of the body of the reactor, and welding the pipes along the outer wall of the reactor as a spiral tunnel shape.

As previously described, the eyebrow type pipe may be obtained by cutting a circular or oval pipe into an eyebrow shape and bending the eyebrow-shaped pipe using a machine as needed such that the eyebrow-shaped pipe forms a hermetically sealed tunnel when the eyebrow-shaped pipe is welded along the outer wall of the reactor or may be manufactured to have a specific eyebrow shape specified by the present invention during injection molding of a pipe. However, the eyebrow type pipe is not limited thereto.

Specifically, the eyebrow type pipe may be obtained by cutting a circular or oval pipe such that the pipe has a length equivalent to 25 to 40%, 27 to 37%, or 30 to 35% based on the inner diameter of the pipe. In this case, a heat control area of the reactor may be maximized when the pipe is affixed to the reactor.

In addition, welding may be any type the jacket to a polymerization reactor by welding. For example, the welding may include, but is not limited to, arc welding, argon welding, or oxygen welding. The polymerization reactor may be, but is not limited to carbon steel or stainless steel (SUS) material etc.

In addition, a spiral tunnel formed at the outer wall of the polymerization reactor is characterized in that an angle between a normal line of the reactor and a tangent line of the eyebrow coil jacket is equal to or greater than 35° and less than 60°, 35° to 55°, or 35° to 50° (see FIG. 1).

The welding is characterized in full penetration at a welding tangent angle of 50° to 60°, 50° to 55°, or about 55°.

That is, according to the present invention, the gap interval between pipe layers affixed to the reactor may be equal to or less than the distance between the welded portions of the pipe formed on the reactor after the welding further in consideration of full penetration, thereby maximizing the heat control area of the reactor. Upon being maintained an angle of 55° for full penetration during welding the pipe to the body of the reactor, the height d of the half (½) circular pipe 6 is higher than the height e of the eyebrow pipe 5 and the gap interval a between the pipe layers is increased (see FIG. 2).

Thus upon welding the half circular pipe 6 to the outer wall 7 of the body of the reactor, it is required for the gap interval a between the pipe layers (the distance between the jacket welded portions) to be twice the thickness c of the outer wall 7 of the body of the reactor in terms of safety control (see FIG. 3(a) and Korean High-Pressure Gas Safety Control Act (KGS AC111)). As a result, an area a that cannot be utilized as a heat control area is increased and, therefore, heat control efficiency is lowered.

The eyebrow coil jacket 5, on the other hand, the height e of the pipe constituting the coil jacket is relatively low so that there is no need to exist almost the distance a between the jacket welded portions, and therefore, welding point may be only one point. That is, twice the thickness c of the outer wall 7 of the reactor necessary for safety control may be enough to the inner diameter b of the pipe.

As a result, a problem in that a gap interval corresponding to the distance a between the jacket welded portions is generated at both end tips of each jacket welded portion when the half circular pipe is used may be solved by changing of the single welding point and the gap interval may be eliminated or reduced (see FIG. 3(b)).

For reference, it is very important to secure full penetration at the welding process to affix the pipe to the body of the reactor. This is why problems are generated from welding defective portions when high pressure is applied from the interior of the reactor so that expenses due to frequent maintenance and repair are needed, productivity of a product is lowered, and the lifespan of the reactor is reduced.

Specifically, as shown in a sectional view of FIG. 1, it is important to reduce a gap interval between coils when a half (½) circular pipe is welded to the body of a reactor to maximize a heat control area of the reactor. As shown in FIG. 2(b), however, when an angle between a welding rod 4 and the bottom of a welded portion is maintained for full penetration, the welding rod 4 may contact the top portion of the pipe located at a different position. For this reason, it is necessary to spread the gap interval between the coils.

In addition, the gap distance between the welded portions may be twice or more the thickness c of the outer wall of the body of the reactor according to the inner diameter of the pipe.

For reference, it is preferable to form the coil jacket in which the gap interval a between the coil jacket welded portions is apart from twice or more the thickness of the body (a thickness c of the outer wall) upon forming the coil jacket for stability of the reactor. However, in case of having the gap interval between the coils of twice or more the thickness of the body of the reactor, the heat control area of the reactor is considerably reduced so that the heat control effect of the jacket is reduced.

According to the present invention, on the other hand, it is possible to provide an eyebrow coil jacket that is capable of increasing the heat control area of the reactor even when applied to a large-sized reactor so that a heat control amount of the heat control apparatus is improved 20% more than when a half pipe coil is used, a heat control apparatus of a reactor using the eyebrow coil jacket, and a method for manufacturing the heat control apparatus of the reactor.

For example, in FIG. 3(a), in a case in which a length b of a pipe constituting a half pipe coil jacket 6 is 177 mm and a thickness c of the outer wall of the body of a reactor 2 is 33 mm, a distance a between jacket welded portions 8 must be 66 mm. When these values are substituted into an equation b/(b+a) to calculate heat control ability of the coil jacket based on high-pressure gas regulation, 177/(177+66) equals 0.73. This result confirms that 73% based on the area of the reactor can be used as the heat control area of the reactor (see Korean High-Pressure Gas Safety Control Act (KGS AC111)).

On the other hand, in FIG. 3(b), in a case in which a length b of a pipe constituting an eyebrow coil jacket 5 is 177 mm and a thickness c of the outer wall of the body of a reactor 2 is 33 mm, a gap distance a between jacket welded portions 8 may be not 66 mm, but the minimum interval (13 mm) between jacket coils. When these values are substituted into the above equation, 177/(177+13)=0.93. Consequently, it is possible to confirm that 93% the area of the reactor can be used as the heat control area of the reactor. As a result, the heat control area is increased by 20%.

In addition, the above 13 mm corresponds to only one welding point, the gap distance a between the jacket welded portions is equivalent to the length b of the pipe, and thus the gap distance between the jacket welded portions satisfies twice or more the thickness of the reactor.

The reactor comprising the eyebrow coil jacket according to the present invention may be efficiently applied for polymerization reaction, required the heat control of the reactor, such as PVC polymerization etc.

Effects of the Invention

According to the present invention, it is possible to maximize a heat control area only through change of a pipe in conventional reactor jacket equipment, thereby improving a heat control effect of the jacket, and productivity and quality by reduction of reaction time.

DESCRIPTION OF DRAWINGS

FIG. 2(a) shows a half pipe coil type and FIG. 2(b) shows an eyebrow coil type.

FIG. 3(a) shows the section of a half pipe coil jacket and FIG. 3(b) shows the section of an eyebrow coil jacket.

DESCRIPTION OF REFERENCE NUMERALS

Figure 1:
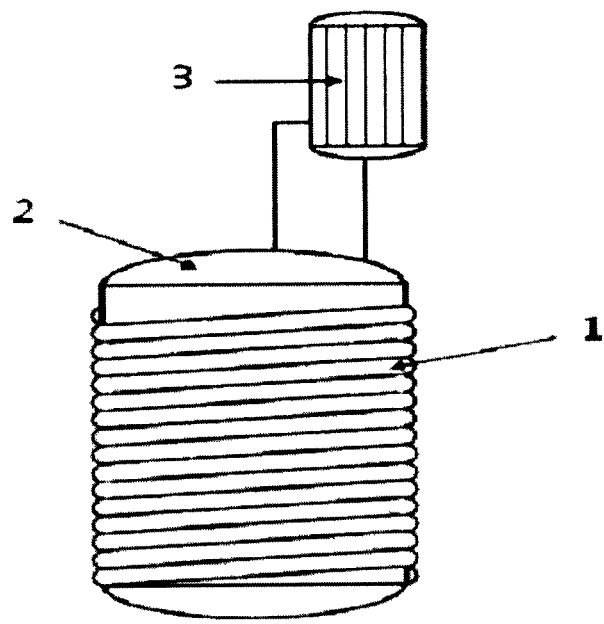
FIG. 1 is a sectional view schematically showing construction of a coil jacket 1, a reactor 2, and a reflux condenser 3 according to manufacture example 1 of the present invention.

1: Coil jacket
2: Reactor
3: Reflux condenser
4: welding rod
5: Section of eyebrow coil jacket
6: Section of half(½) pipe coil jacket
7: Outer wall of body of reactor
8: Jacket welded portion Best Mode Now, preferred embodiments of the present invention will be described so as to allow those skilled in the art to easily understand the present invention through the preferred embodiments. However, the following embodiments are disclosed for illustrative purposes and, therefore, those skilled in the art will appreciate that various changes and modifications are possible without departing from the scope and spirit of the invention. In addition, it is obvious that such changes and modifications belong to the accompanying claims.

Hereinafter, a method of polymerizing a vinyl chloride polymer will be proposed as a manufacture example to assist understanding of the present invention. However, a manufacturing method to embody the present invention is not limited thereto.

Manufacture Example 1

A circular pipe (having an inner diameter of about 203 mm) made of carbon steel or stainless steel was cut such that the circular pipe had a length equivalent to 33.3% based on the inner diameter of the circular pipe and the circular pipe was bent using a machine as needed to form a sealed tunnel when the circular pipe was welded along the outer wall of a reactor to prepare a plurality of eyebrow type cutouts.

The above eyebrow type cutouts were wound on the outer wall (having a thickness of 33 mm) of a stainless steel polymerization reactor 2, having an inner volume of 1 m$^3$, provided with a reflux condenser 3, by any one of arc welding, argon welding, or oxygen welding, in a spiral shape such that an angle between a normal line of the reactor 2 and a tangent line of an eyebrow coil jacket 5 was 35° to provide a coil jacket 1 (see FIG. 1).

Figure 2:
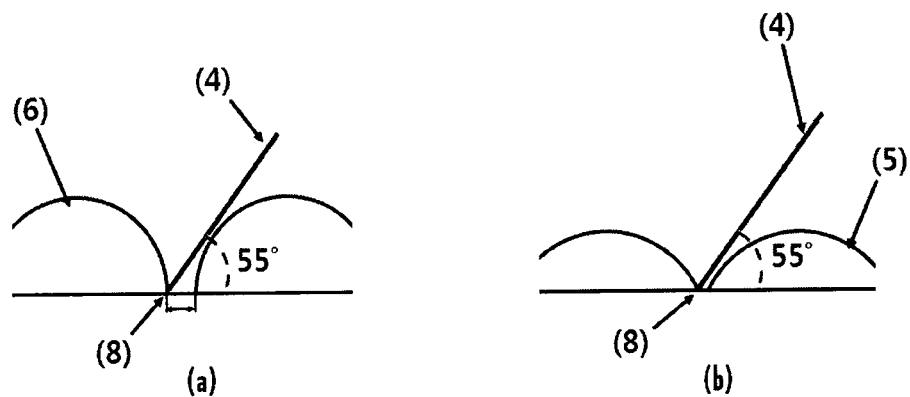
FIG. 2 is a sectional view schematically showing a coil interval and a welding tangent angle upon welding of the jacket.
Figure 3:
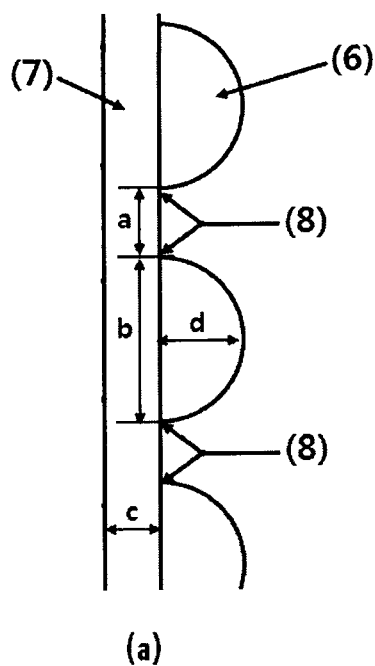
FIG. 3 is a sectional view schematically showing a coil jacket provided at the outer wall of the body of the reactor 1 of FIG. 1.
Figure 3:
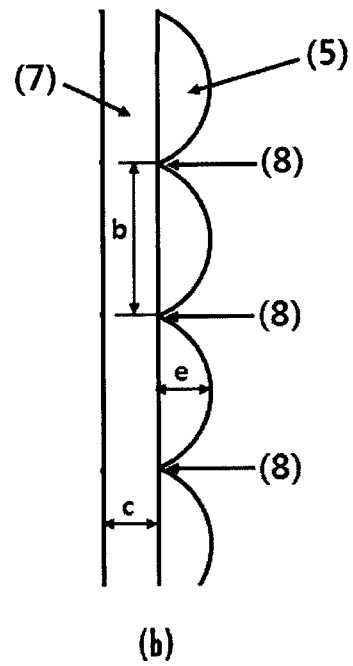

Specifically, the above welding was performed through full penetration in a state in which a welding tangent angle of a welding rod 4 was 55° as shown in FIG. 2(b) such that a gap interval a between jacket welded portions 8 of the eyebrow coil jacket 5 was 13 mm and a length b of the pipe constituting the coil jacket was 177 mm as shown in FIG. 3(b) (the gap interval a between the coil jacket welded portions 8 was apart from twice or more the thickness of the body (thickness c of the outer wall)).

Manufacture Example 2

A circular pipe made of the same material as the manufacture example 1 was cut such that the circular pipe had a length equivalent to 50% based on the inner diameter of the circular pipe to prepare a plurality of half pipe type cutouts.

The above half pipe type cutouts were wound on the outer wall (having a thickness of 33 mm) of a stainless steel polymerization reactor 2, having an inner volume of 1 m$^3$, provided with a reflux condenser 3, by any one of arc welding, argon welding, or oxygen welding, in a spiral shape such that an angle between a normal line of the reactor 2 and a tangent line of a half pipe coil jacket 6 was 35° to provide a coil jacket 1 (see FIG. 1).

The above welding was performed through full penetration in a state in which a welding tangent angle of a welding rod 4 was 55° as shown in FIG. 2(a) such that a gap interval a between jacket welded portions 8 formed by the half pipe coil jacket 6 was 66 mm and a length b of the pipe constituting the coil jacket was 177 mm as shown in FIG. 3(a) (the gap interval a between the coil jacket welded portions 8 was apart from twice or more the thickness of the body (thickness c of the outer wall)).

Manufacture Example 3

A jacket was manufactured using the same process as the manufacture example 1 except that the jacket was wound on the outer wall of a reactor 2 in a spiral shape such that an angle between a normal line of the reactor 2 and a tangent line of an eyebrow coil jacket 5 was 30° (a gap interval a between coil jacket welded portions was apart from twice or more the thickness of the body (thickness c of the outer wall)).

Manufacture Example 4

A jacket was manufactured using the same process as the manufacture example 1 except that the jacket was wound on the outer wall of a reactor 2 in a spiral shape such that an angle between a normal line of the reactor 2 and a tangent line of an eyebrow coil jacket 5 was 60°.

In this case, a gap interval a between jacket welded portions formed by the eyebrow coil jacket 5 was 80 mm and a length b of the pipe constituting the coil jacket was 177 mm as shown in FIG. 3(a) (the gap interval a between the coil jacket welded portions was apart from twice or more the thickness of the body (thickness c of the outer wall)).

EXAMPLES

Example 1

130 weight parts of polymerization water, 0.05 weight part of polyvinyl alcohol having a degree of hydration of 88%, 0.02 weight part of polyvinyl alcohol having a degree of hydration of 72%, 0.01 weight part of polyvinyl alcohol having a degree of hydration of 55%, 0.01 weight part of hydroxypropylmethyl cellulose, 0.075 weight part of t-butylperoxy neodecanoate (BND), and 0.019 weight part of α-cumylperoxyneodecanoate (CND) were added in the polymerization reactor 2 according to manufacture example 1.

Subsequently, the reactor was evacuated by a vacuum pump during stirring and 100 weight parts of a vinyl chloride monomer was added into the reactor. In addition, a valve of a reflux condenser 3 was opened upon initiation of polymerization such that pressure change was not generated and a coolant was circulated into an eyebrow coil jacket 1 to perform heat exchange.

Polymerization was performed in a state in which the reactor was maintained at a temperature of 57° C. and the polymerization was stopped when the pressure of the reactor was changed by 1.0 kg/cm$^2$.

Subsequently, 0.05 weight part of triethylene glycol-bis-[3-(3-t-butyl-5-methyl-4-hydroxy phenyl) propionate] was added as an antioxidant and unreacted monomer was collected to obtain resin slurry.

Example 2

Resin slurry was obtained in the same manner as in example 1 except that 0.025 weight part of polyvinyl alcohol having a degree of hydration of 88%, 0.041 weight part of polyvinyl alcohol having a degree of hydration of 72%, 0.032 weight part of polyvinyl alcohol having a degree of hydration of 55%, 0.01 weight part of hydroxypropylmethyl cellulose, 0.068 weight part of t-butylperoxy neodecanoate (BND), and 0.017 weight part of α-cumylperoxyneodecanoate (CND) were used and the polymerization temperature was 58° C.

Comparative Example 1

Resin slurry was obtained in the same manner as in example 1 except that the reactor of manufacture example 1 was replaced by the reactor of manufacture example 2 and 0.070 weight part of t-butylperoxy neodecanoate (BND) and 0.018 weight part of α-cumylperoxyneodecanoate (CND) were used.

Comparative Example 2

Resin slurry was obtained in the same manner as in example 2 except that the reactor of manufacture example 1 was replaced by the reactor of manufacture example 2 and 0.064 weight part of t-butylperoxy neodecanoate (BND) and 0.016 weight part of α-cumylperoxyneodecanoate (CND) were used.

Comparative Example 3

Polymerization was performed in the same manner as in example 1 except that the reactor of manufacture example 1 was replaced by the reactor of manufacture example 3.

However, an angle for full penetration of the reactor itself was increased so that a welding defect state of a jacket disposed in the reactor was serious. Consequently, a coolant could not be circulated in the eyebrow coil jacket 1 so that the polymerization reaction was not proceeded.

Comparative Example 4

Resin slurry was obtained in the same manner as in example 1 except that the reactor of manufacture example 1 was replaced by the reactor of manufacture example 4.

For reference, examples 1 and 2 were used the reactors applied the eyebrow coil jacket 5 of manufacture example 1, comparative examples 1 and 2 were used the reactors installed the half pipe coil jacket 6 of manufacture example 2, and comparative example 4 was used the reactor, in which the tangent angle of the eyebrow coil jacket 5 of manufacture example 4 vary.

Physical properties of the vinyl chloride polymers manufactured according to examples 1, 2 and comparative examples 1, 2, and 4 were measured using the following method. The measurement results are shown in Table 1 below. The specific measurement method is as follows:

Average particle size: was measured based on ASTM D 1243-79.

Apparent specific gravity: was measured based on ASTM D1895-89.

Plasticizer absorptivity: a ratio of a content of dioctyl phthalate (DOP) plasticizer absorbed to a weight of the sample before absorption was expressed in weight part based on ASTM D3367-95.

Number of fish eyes: 45 weight parts of a dioctyl phthalate (DOP) plasticizer, 0.1 weight part of barium stearate, 0.2 weight part of tin-based stabilizer, and 0.1 weight part of carbon black were mixed with 100 weight part of the manufactured vinyl chloride polymer using a 6 inch roll at a temperature of 140° C. for 4 minutes to manufacture a sheet having a thickness of 0.3 mm, and then the number of white transparent particles in 100 cm$^2$ of the sheet was measured with the naked eye.

Foam level: was measured using a foam detector during polymerization. The highest level was recorded.

Heat control area of reactor: the gap interval a between the jacket welded portions was calculated from the thickness c of the outer wall of the body of the reactor, and then the calculated interval between the jacket welded portions was substituted into below equation to calculate heat control ability of the coil jacket according to high-pressure gas regulation together with the length b of the pipe constituting the coil jacket.

Heat control area of reactor (%)=$b/(b+a)\times100$    [Equation 1]

TABLE 1

| Measurement items | Example 1 | Example 2 | Comparative example 1 | Comparative example 2 | Comparative example 4 |
|---|---|---|---|---|---|
| Average particle size (μm) | 176 | 148 | 183 | 145 | 186 |
| Apparent specific gravity (g/cc) | 0.573 | 0.529 | 0.579 | 0.533 | 0.568 |
| Plasticizer absorptivity (wt %) | 16.7 | 26.5 | 16.5 | 26.1 | 16.9 |
| Polymerization time (min) | 207 | 209 | 218 | 219 | 211 |
| Fish eyes (number) | — | 18 | — | 20 | — |
| Foam level (%) | 6 | 11 | 8 | 13 | 22 |
| Heat control area of reactor (%) | 93 | 93 | 73 | 73 | 69 |

As shown in the above Table 1, reaction time in examples 1 and 2 using the reactors applied the eyebrow coil jacket 5 of manufacture example 1, was decreased as compared with in comparative examples 1 and 2 using the reactors applied the half pipe coil jacket 6 of manufacture example 2.

On the other hand, it can be seen that polymerization time in comparative example 4 was similar to that in example 1 due to the same initiator content; however, heat control portion of the reflux condenser was increased according to reduction in heat control portion of the reactor.

In addition, quality improvement equal to or greater than in comparative examples 1 and 2 was achieved in examples 1 and 2, in which the introduction amount of the initiator was increased so that the exothermic amount was increased and thus the heat control portion of the reflux condenser 3 was decreased.

As described above, the heat control portion of the reflux condenser 3 is increased, and thus the height of foam generated during polymerization is increased due to the increase in content of the vinyl chloride monomer evaporated in a liquid state during reaction. Consequently, the increase in heat control rate of the jacket can be indirectly confirmed.

As the result of confirming the foam level state, it could be confirmed that in examples 1 and 2, in which the amount of the initiator was increased, had foam levels similar to those in comparative examples 1 and 2.

Therefore, it was examined that the reactors having the eyebrow coil jacket 5 according to examples 1 and 2 had a higher heat control effect than the conventional reactor having the half pipe coil jacket 6.

Meanwhile, it was confirmed that the foam level in comparative example 4 was higher than that in example 1. This is why the angle between the normal line of the reactor and the tangent line of the jacket is increased, and thus the gap interval between the jacket coils is increased so that the heat control area of the jacket is decreased during polymerization.

Furthermore, if the heat control portion of the reflux condenser 3 is increased so that a large amount of foam is generated, scale is formed in the polymerization reactor 2. As a result, heat control efficiency is deteriorated, and thus a productivity yield may be reduced in the long term.

Moreover, examples 1 and 2 using the reactor of manufacture example 1 were used 93% based on the area of the reactor as the heat control area. On the other hand, comparative examples 1 and 2 using the reactor of manufacture example 2 were used 73% based on the area of the reactor as the heat control area, and comparative example 4 using the reactor of manufacture example 4 was used 69% based on the area of the reactor as the heat control area.

According to the present invention, therefore, the heat control area of the reactor may be increased by 20% or more than in the conventional art.

What is claimed is:

1. A reactor including a reflux condenser, an outer wall having an outer surface, and a heat control apparatus, the heat control apparatus comprises a semi-circularly shaped pipe having a radius of curvature and a chord length that is 50 to 80% of the radius, the semi-circularly shaped pipe includes first and second edges along the length of the pipe, the edges defined by the ends of the semi-circular shape, wherein the semi-circularly shaped pipe is provided along the outer wall of the reactor such that the edges contact the outer surface, wherein the semi-circularly shaped pipe forms a spiral tunnel having a plurality of adjacent spirals surrounding the reactor, wherein the spiral tunnel is provided along the outer wall such that the first and second edges of the adjacent spirals are fixed to the outer wall by a single welding portion, wherein the reactor is a continuous or batch polymerization reactor for exothermic polyvinyl chloride polymerization, wherein the spiral tunnel is configured such that each contact point between the edges of the semi-circularly shaped pipe and the outer surface of the reactor defines a respective angle, wherein the angle is between a normal line of the outer surface at the respective contact point and a tangent line of the semi-circular shaped pipe at the edge at the respective contact point, wherein the angle is equal to or greater than 35° and less than 50°, and wherein the chord length of the semi-circularly shaped pipe is twice or more of a thickness of the outer wall of the reactor.

2. The reactor of claim 1, wherein the semi-circularly shaped pipe is obtained by cutting a circular pipe into the semi-circular shape.

3. The reactor of claim 2, wherein the semi-circularly shaped pipe is made of carbon steel or stainless steel.

4. The reactor of claim 1, wherein the reactor is configured to circulate a coolant through the spiral tunnel to perform heat exchange.

5. A method for manufacturing the reactor of claim 1, the method comprising the steps of: placing the semi-circularly shaped pipe on the outer surface of the reactor; and welding the pipe to the outer wall.

6. The method of claim 5, wherein the welding is performed by any one of arc welding, argon welding, and oxygen welding.

* * * * *